Patented Oct. 8, 1929

1,730,801

UNITED STATES PATENT OFFICE

HERBERT C. BUGBIRD, OF NEW BRIGHTON, NEW YORK, ASSIGNOR TO S. D. WARREN COMPANY, OF BOSTON, MASSACHUSETTS, A CORPORATION OF MASSACHUSETTS

METHOD OF TREATING MOLDS

No Drawing. Application filed November 1, 1927. Serial No. 230,393.

This invention relates to a method of treating molds for the casting of molten metals or the like therein.

In the casting of molten metal, it is usual practice to first prepare a mold of sand, comprising a lower half or "drag", and an upper half or "cope", and to then cover the interior surfaces of the mold with a finely divided inert powder, or parting compound, so that the sections may be separated without disturbing the surfaces of the sand. Various powders have been employed for this purpose but such as are found to be satisfactory occur in but limited quantity and in districts relatively remote from the industrial centers where they are used. Consequently, they are expensive and not conveniently obtained.

Accordingly, it is an object of the present invention to provide a method for treating molds, satisfactorily to accomplish these results, with materials which are obtainable in large quantity and from sources convenient to the industrial districts where such operations are commonly conducted. Other objects will appear from the following disclosure.

The method of the invention includes applying to the surfaces of the molding sand, in both the drag and cope of the mold, a thin but continuous and uniform layer of a powdered material, the individual particles of which are characterized by containing a carbonate of the alkaline-earth metals, such as precipitated calcium carbonate, and by having a coating formed by the chemical combination of the same with an organic or fatty acid radical, such as oleic acid.

Such a powder may be prepared by treating a finely powdered material containing an alkaline-earth metal, such as precipitated calcium carbonate or finely divided waste lime mud, conveniently in water suspension, with an emulsion of a suitable organic compound, such as a fatty acid or a solution of a soluble salt of such acid (e. g. oleic acid or sodium oleate, respectively) in which the acid radical is reactive with the alkaline-earth carbonate to form an insoluble water repellent coating upon the individual particles of the powder. The liquid charge may be agitated and heated, preferably to boiling, during the gradual admixture of the solution or emulsion of the coating reagent and the powdered material to be coated therewith. The mixture may be simultaneously or subsequently diluted to a sufficiently fluid consistency to permit of transferring the suspension to other apparatus.

The coating reagent reacts upon the surfaces of the particles of the mud (which are very slightly soluble)—or with the reactive, partially dissolved film of calcium carbonate thereon which may be in the nature of a superficial film of carbonate solution, to form an adherent coating of an insoluble soap, such as calcium oleate. The coated particles are then filtered off, the filter cake dried and crushed to a finely divided condition, and preferably screened or otherwise reduced to a uniformly small particle size.

As thus obtained, the particles of lime mud are extremely finely divided, and are individually covered with an insoluble continuous water repellent coating of calcium oleate, for example, which is insoluble and not wet by water. The powder is easily disseminated, since it "spatters" upon falling, and floats in the air. At ordinary temperatures it does not become compacted—but at elevated temperatures or pressures the individual particles cohere.

The molds may be made in the usual way, as by embedding the pattern in molding sand (contained in the drag, for example) to form the desired impression and by embedding the other half of the pattern in the sand contained in the cope. The metal-contacting surfaces as well as the surfaces in the drag and cope of the mold which contact with each other, may then be uniformly dusted with a layer of the powder above described. This may conveniently be effected by loading the dry powder into a muslin, or closer meshed cotton bag and shaking or tapping the same while passing it over the surfaces of the mold. This screens and deposits an extremely fine shower of the powder upon the mold and, being white, it is easily observed and indicates readily whether the deposit is continuous and uniformly applied. Owing to its peculiar properties, it is adapted to form a layer of uniform thickness and to retain such uniformity over the irregularly disposed surfaces and contours of the mold.

The sections of the mold are then secured together and the molten metal is then poured into the dusted mold and flows evenly over the entire surface,—which corresponds accurately to the dimensions of the pattern but in which the irregularities and pore spaces between the granules of molding sand are effectively filled and closed by the deposited layer of powder. Consequently, the metal can not wet or penetrate into the molding sand. While the heat and pressure may fuse the coating material on the individual particles of the powder, this serves merely to spread it into a more continuous and impervious sheet over the surface of the mold and hence to produce a more smooth and uniform surface corresponding thereto, on the molten metal of the casting. Upon cooling and solidification of the casting, the cope and drag of the mold may be separated and withdrawn, whereupon the molding sand of the two sections parts freely along the plane of division between them and remains integral and intact for further use, after the casting is removed.

I claim:

1. Method of preparing molds for casting molten metals, which comprises dusting the surfaces with a powder characterized by containing particles of an alkaline-earth metal carbonate individually covered by a coating precipitated thereon by superficial chemical reaction with a fatty acid radical.

2. Method of preparing molds for casting molten metals, which comprises dusting the contacting surfaces between the drag and cope sections thereof with a powder characterized by containing precipitated calcium carbonate particles, individually covered with a coating composed of said calcium carbonate in superficial chemical combination with a fatty acid radical.

3. Method of preparing molds for casting molten metals, which comprises dusting the contacting surfaces between the drag and cope sections thereof with a powder characterized by containing precipitated calcium carbonate particles, individually covered with a coating composed of said calcium carbonate in superficial chemical combination with an oleic acid radical.

Signed by me at New York, N. Y., this 21st day of September, 1927.

HERBERT C. BUGBIRD.